United States Patent [19]

Siegert et al.

[11] Patent Number: 4,673,730
[45] Date of Patent: Jun. 16, 1987

[54] METHOD FOR RECOVERING AROMATIC POLYETHERS

[75] Inventors: Hermann Siegert; Werner Ude, both of Darmstadt, Fed. Rep. of Germany

[73] Assignee: Röhm GmbH, Darmstadt, Fed. Rep. of Germany

[21] Appl. No.: 853,732

[22] Filed: Apr. 18, 1986

[30] Foreign Application Priority Data

Apr. 26, 1985 [DE] Fed. Rep. of Germany ....... 3515138

[51] Int. Cl.[4] .............................................. C08L 89/00
[52] U.S. Cl. .................................... 528/491; 528/492; 528/494; 528/169; 528/168; 528/485
[58] Field of Search ............... 528/491, 492, 494, 169, 528/168, 485

[56] References Cited

U.S. PATENT DOCUMENTS

| | | | |
|---|---|---|---|
| 3,532,677 | 10/1970 | Baron ................................... | 528/492 |
| 4,035,357 | 7/1977 | Cooper et al. ....................... | 528/215 |
| 4,042,542 | 8/1977 | Kim ..................................... | 528/491 |
| 4,097,459 | 6/1978 | Bennett et al. ....................... | 528/215 |
| 4,492,805 | 1/1985 | Besecke et al. ....................... | 568/12 |

FOREIGN PATENT DOCUMENTS

| | | |
|---|---|---|
| 1879 | 5/1979 | European Pat. Off. . |
| 116442 | 8/1984 | European Pat. Off. . |
| 1570469 | 4/1970 | Fed. Rep. of Germany . |
| 2460323 | 7/1975 | Fed. Rep. of Germany . |
| 2746420 | 4/1978 | Fed. Rep. of Germany . |

OTHER PUBLICATIONS

Vollmert, Grundriss der Makomolekularen Chemie, E. Volmert-Verlag, Karlsruhe, 1980, vol. II, p. 31.
Ullmann's Enzyklopaedie der Technischen Chemie, 4th Edn., vol. II, pp. 635–639.
Bindhal et al., Arzneim. Forsch/Drug Research, 30(I), No. 2 (1980), pp. 234–235.

*Primary Examiner*—John Kight
*Assistant Examiner*—M. L. Moore
*Attorney, Agent, or Firm*—Curtis, Morris & Safford

[57] ABSTRACT

Method for recovering an aromatic polyether as a solid product from a solution thereof in an organic solvent by precipitating with a fluorohydrocarbon which may also contain chlorine or bromine and which boils at −30° C. to +100° C.

6 Claims, No Drawings

METHOD FOR RECOVERING AROMATIC POLYETHERS

The present invention relates to a method for recovering an aromatic polyether as a solid from a solution thereof in an organic solvent.

Aromatic polyethers are polymeric compounds in which the structural elements of the polymer chains are inter alia constructed of oxygen atoms bivalently coupled to arylene units, with these aromatic ether groups constituting parts of the main chain. Aromatic polyethers of this type are widely known and are to some extent employed as industrial materials. Especially worthy of mention are the polymer obtained by the oxidative coupling of 2,6-dimethylphenol, called "PPO", and polyether sulfones such as those marketed under the brand names "Polyethersulfon 200 P" and "Udel" for instance. Aromatic polyether ketones are known for example from European patent application No.0 001 879 and can be obtained by the polycondensation of 4,4'-difluorobenzophenone with hydroquinone or 4,4'-dihydroxy-diphenyl ether or 2,2-bis-(4-hydroxyphenyl) propane, known as bisphenol A. Polyethers that still have phosphorus in the structural elements of the polymer chain are described in U.S. Pat. No. 4,492,805 and are manufactured by the polycondensation of bifunctional starting compounds like arylenediols with di-(halophenyl)-phenyl phosphines or the corresponding phosphine oxides. The polycondensation is preponderantly carried out in solution, with N-methyl pyrrolidone, for example, being an appropriate solvent for manufacturing the phosphorus-containing polyarylene ethers. To obtain higher molecular weights, solvents that can dissolve both the monomeric starting materials and the corresponding polycondensate are employed as reaction media. Solvents that usually fulfill these demands are not only such polar, high-boiling, substances as dimethyl formamide, dimethyl acetamide, N-methyl pyrrolidone, diphenyl sulfone, and sulfolane, but also the relatively low-boiling methylene chloride. Using media of this type is a great advantage in manufacturing polymers because they reduce the viscosity of the reaction mixtures and increase their polarity, which is necessary to obtain a high conversion and hence increase the molecular weight.

The technically interesting range of molecular weights for the aromatic polyethers employed for further processing into serviceable pieces is above 10000. Thus, polymers with molecular weights of 100,000, for instance, are obtained from 2,6-dimethylphenol, and the phosphorus-containing polyarylene ethers taught in U.S. Pat. No. 4,492,805 are said to have molecular weights of at least 10000 and preferably 15000 to 500,000.

Although the polymer can be obtained from the reaction mixture in the form of a solid product by distilling off the solvent, the polymer is usually precipitated by mixing the reaction batch with a liquid. Thus, B. Vollmert, *Grundriss der Makromolekularen Chemie*, E. Vollmert-Verlag, Karlsruhe, 1980, Vol. II, page 31, describes precipitating PPO from a viscous synthesis solution with methyl alcohol, and U.S. Pat. No. 4,492,805 describes precipitating phosphorus-containing polyethers with mixtures of methyl alcohol and water from the solutions obtained when synthesizing them.

The liquids employed up to now to precipitate aromatic polyethers have various drawbacks. For example, the evaporation enthalpies are high: 1101.39 kJ/kg for methyl alcohol and 2257.22 kJ/kg for water at their boiling points. The high evaporation energy makes the requisite distillation mixture of reaction medium and precipitant very expensive. Furthermore, since precipitation with the conventional liquids is not very selective, it does not lead to the desired purity and fractionation of the precipitated product. Oligomers, for instance, which are polycondensates with molecular weights of less than 10,000 and which have a deleterious effect on the properties of the polymers, are not completely separated.

The object of the present invention is to provide a method for isolating or recovering aromatic polyethers from solutions by precipitating them with precipitants which cannot only be easily and cost-effectively recovered, during further processing, from the reaction medium or by reprecipitation from the used solvent, but which will contribute to fractionating the reaction product.

It has been discovered that this object can, surprisingly, be attained by separating aromatic polyethers from solutions thereof by precipitating them with specific fluorohydrocarbons. Solvents for polyethers are organic, polar, aprotic compounds which are liquid in the anticipated operating range from −30° C. to 120° C. such as dichloromethane, N-methylpyrrolidone, dimethylsulfoxide, dimethylformamide, tetrahydrofuran, and tetramethylsulfone.

Using fluorohydrocarbons having 1 to 4 carbon atoms, possibly having chlorine atoms and/or bromine atoms, and having no or no more than 4 hydrogen atoms in the molecule, as precipitants for the isolation of polyethers will attain the object of the invention with respect to the demands for both a low evaporation enthalpy and for separation of the oligomers. The heats of evaporation of the fluorinated hydrocarbons employed to carry out the invention, which compounds may be saturated or unsaturated, are in the range of 150 ±30 kJ/kg at the boiling point of the compounds. In terms of a comparable mass of methyl alcohol, this means that only about 1/6 to 1/9 as much evaporation energy is consumed in processing the reaction medium or the mixture of solvent and precipitant by the method in accordance with the invention as would be consumed with methyl alcohol as a precipitant. In comparison with water, which can be employed as part of the precipitant at the state of the art, the energy of evaporation is even lower —about 1/12 to 1/18 —for the same mass.

It has also been discovered that the new method will precipitate only the high molecular weight constituents of the reaction product, with the oligomers remaining in solution. The oligomers are then subjected to additional polycondensation once the precipitant has been separated with the polar solvent. The particular advantage of the new method, specifically purifying the polymers by separating the oligomeric constituents out while the polyether is being recovered, is evident from the properties of the precipitated product. Whereas the reaction product precipitated with methyl alcohol and/or water is usually sticky due to its content of relatively low molecular weight polycondensation products and must be subjected to further purification, the polymer when precipitated with fluoro-chloro-bromo-hydrocarbons has also been discovered to be not sticky, but powdery to flocculant. In this form the polymer can easily be separated, by filtration for instance, from the liquid phase and washed and dried if necessary, and will be in a convenient condition for further processing.

Employing highly halogenated chloro-fluoro-hydro carbons in accordance with the invention to obtain the polymers by precipitation entails still another advantage. These substances, unlike methyl alcohol and such other precipitants such as hydrocarbons, are noncombustible and are distinguished by their high physiological compatibility.

The method of the invention can be carried out with fluorinated aliphatic compounds, preferably alkanes, having 1 to 4 carbon atoms, having possible chlorine atoms and bromine atoms, and with no to no more than 4 hydrogen atoms in the molecule. Thus, the compounds include fluorocarbons, fluorohydrocarbons, and chlorofluoroalkanes which all may additionally contain bromine. Such compounds are well known in the art and are discussed under "Organic Fluorocompounds" in Ullmann's *Enzyklopedie der Technischen Chemie* ("Encyclopedia of Technical Chemistry", 4th Edition, Vol. 11, pages 635–639.

The dielectric constant of the halogenated alkanes employed as precipitants is less than 7 (measured in the liquid at 25°, cf. Ullmann, op cit. 3rd Edition., 2/1, pp. 460–63). Appropriate compounds, for example, are 1,1,2-trichloro-1,2,2-trifluoroethane, 1,2-dichlorotetrafluoroethane, 1,2-dibromotetrafluoroethane, 2-chloro-1,1,1-trifluoro-2-bromoethane, and octafluorocyclobutane, as well as such unsaturated halogen hydrocarbons as 1,1-dichloro-difluoroethylene and 1-chloro-2,2-difluoroethylene.

Mixtures of the fluorinated hydrocarbons can also be used in the method. Practical fluorinated hydrocarbons have boiling points in the range of −30° C. to +100° C.

The polyether is precipitated from its solution at a temperature that depends on the boiling point of the particular fluorinated hydrocarbon employed. The general range is from 0° C. to 120° C. The relatively low boiling points of the precipitant often makes it necessary to carry out the precipitation in a pressurized vessel (a closed agitated tank, for example) and to introduce the precipitant in the form of a gas. It is practical to prevent agglomeration by continuously adding the precipitant with stirring. In an opposite procedure, the polymer solution can, when necessary, be introduced into the fluorinated hydrocarbon.

The concentration of aromatic polyether in the solution being treated can vary widely, from about 1 to about 50 percent by weight, and depends in particular on the molecular weight of the polymer, which in turn dictates the viscosity of the solution and hence how easy it is to handle. About 10 to 150 parts of precipitant per part of dissolved polyether are employed to precipitate the polymer. The amount of precipitant also depends on the specific dissolving power of the solvent for the polymer and on the intended degree of fractionation. The polyether, which precipitates out in a powdered or flocculant form, can be separated from the liquid medium by filtration or by screen centrifuging, for example, washed in a practical way with the same precipitant if necessary, and dried.

The halogenated precipitant can easily be distilled from the polar solvent or reaction medium at relatively low energy consumption and recovered. Oligomeric condensation constituents will remain dissolved in the distillation residue and can be subjected to additional polycondensation.

A better understanding of the present invention and of its many advantages will be had by referring to the following specific examples, given by way of illustration.

EXAMPLE 1

342.5 g (1.5 moles) of bisphenol A, 327.0 g (1.5 moles) of 4,4'-difluorobenzophenone, 220.0 g (1.6 moles) of potassium carbonate, 2270 g of N-methylpyrrolidone, and 750 g of chlorobenzene were heated to boiling in a 6-liter four-necked flask equipped with a stirrer, a dropping funnel, a Claisen apparatus, and a Liebig condenser. A mixture of chlorobenzene and water was distilled off as far as possible. Another 750 g of chlorobenzene was dropped into the reaction mixture and concurrently distilled off. The reaction mixture was maintained at 160° C. for 15 hours, after which the condensation was discontinued by pumping methyl chloride in at the same temperature. 100 ml of N-methylpyrrolidone were then added to the reaction flask and its contents suctioned through a coarse glass filter. The filter residue was rewashed with 70 ml of N-methylpyrrolidone.

To precipitate the polyether, 5 g of the filtrate (containing approximately 1 g of the polycondensate) were employed. 100 ml of 1,1,2-trichloro-1,2,2-trifluoroethane were stirred as strongly as possible with a vane stirrer in a 250 ml Witt jar at room temperature and the polycondensate solution was slowly dropped in over about 15 minutes. Agitation was continued for about another 15 minutes and the flocculant polyether precipitate was then suctioned off and rewashed with 20 ml of 1,1,2-trichloro1,2,2-trifluoroethane. Drying yielded 0.75 g of polycondensate.

EXAMPLE 2

60 g of the polyether solution of 4,4'-difluorobenzophenone and bisphenol A (approximately 12 g of polycondensate) described in Example 1 were dropped as described in that Example into 600 ml of 1,1,2-trichloro-1,2,2-trifluoroethane. Agitation was continued for another 15 minutes. The precipitate was suctioned off and rewashed with about 200 ml of the precipitant. The flocculant precipitate was dried to constant weight, first at room temperature and then in vacuum at 90° C. The yield was 10 g of polycondensate.

EXAMPLE 3

5 g of a polyether made from bisphenol A and 4,4'-difluorobenzophenone were dissolved in 45 g of dichloromethane. 25 g of this solution were dropped at about 20° C. into 500 ml of strongly agitated 1,1,2-trichloro-1,2,2-trifluoroethane. Agitation was continued for another 15 minutes. The resulting voluminous, white, flocculant, and non-sticky precipitate was suctioned off, rewashed with about 100 ml of the same precipitate, and dried to constant weight at 60° C. The yield was 3.5 g of the original polycondensate.

EXAMPLE 4

10 g of a polycondensate of 4,4'-difluoro-triphenyl-phosphinic oxide and bisphenol A were dissolved in 50 ml of N-methylpyrrolidone. The solution was dropped slowly into 700 ml of well stirred 1,1,2-trichloro-1,2,2-trifluoroethane. Stirring was continued for another 30 minutes. The precipitate was suctioned off and the filter residue rewashed with about 100 ml of the same precipitant. The flocculant precipitate was dried in vacuum at 100° to constant weight. The yield was 7.5 g. A flexible sheet of cast resin was manufactured from the polymer.

The fluorohydrocarbon was recovered from the filtrate by distillation and the N-methylpyrrolidone, still containing polycondensate, was transferred to a new batch.

EXAMPLE 5

2 g of a polycondensate formed from bisphenol A and 4,4'-dichlorodiphenolsulfone were dissolved in 15 g of dimethylacetamide. This solution was added dropwise at about 20° C. with intensive stirring to 300 ml of bromochlorodifluoromethane ("Frigen 12BI") having a boiling point of −4° C. present in a 1 liter glass autoclave. The autogenous pressure which was established in the reaction vessel was about 2.5 bars. Subsequently, the mixture was stirred for an additional 15 minutes and the liquid phase was then removed by filtration through a coarse frit into a 1 liter flask having an exhaust connection and cooled with acetone/dry ice. The polycondensate which precipitated was washed with bromochlorodifluoromethane. After drying a 70° C. in vacuum to constant weight, 1.7 g of a flocculant polycondensate were obtained.

EXAMPLE 6

5 g of a polycondensate formed between bisphenol A and 4,4'-difluorobenzophenone were dissolved in 25 g of anhydrous tetrahydrofuran. This solution was slowly dropped at 0° C. and with good stirring into 3 ml of trichlorofluoromethane ("Frigen 11") having a boiling point of 23° C. Subsequently, the mixture was stirred for an additional 20 minutes. The white flocculant precipitate which formed was recovered from the liquid by filtration into a cooled vessel, was washed with about 50 ml of the precipitant, cooled to 0° C., and subsequently was dried to constant weight in vacuum at 80° C. 4 g of polycondensate were obtained.

EXAMPLE 7

A solution of 2 g of a polyether formed between bisphenol A and 4,4'-difluorobenzophenone in 10 g of 1,3- dimethyl-3,4,5,6-tetrahydro-2(1H)-pyrimidinone was treated as in Example 5, with the difference that about 100 ml of a 1:1 mixture (by volume) of dichlorotetrafluoroethane ("Frigen 114") having a boiling point of 3° C. and of trichlorotrifluoroethane ("Frigen 113") having a boiling point of 47° C. were used. 1.5 g of polyether were obtained.

We claim:

1. A method for recovering an aromatic polyether as a solid from a solution thereof in an organic solvent, which method comprises precipitating said polyether with at least one fluorinated hydrocarbon having 1 to 4 carbon atoms and having no or no more than 4 hydrogen atoms in the molecule.

2. A method as in claim 1 wherein said fluorinated hydrocarbon additionally contains atoms selected from the group consisting of chlorine and bromine atoms.

3. A method as in claim 1 wherein the precipitant is a fluorinated hydrocarbon having a boiling point from −30° C. to +100° C. at normal pressure.

4. A method as in claim 1 wherein the precipitation is carried out at a temperature from −30° C. to 120° C.

5. A method as in claim 1 wherein the precipitation is carried out under superatmospheric pressure.

6. A method as in claim 1 wherein the precipitant is a mixture of fluorinated hydrocarbons.

* * * * *